April 1, 1930. C. M. DYKES 1,752,375
PEANUT PICKING MACHINE
Filed May 10, 1928 3 Sheets-Sheet 2
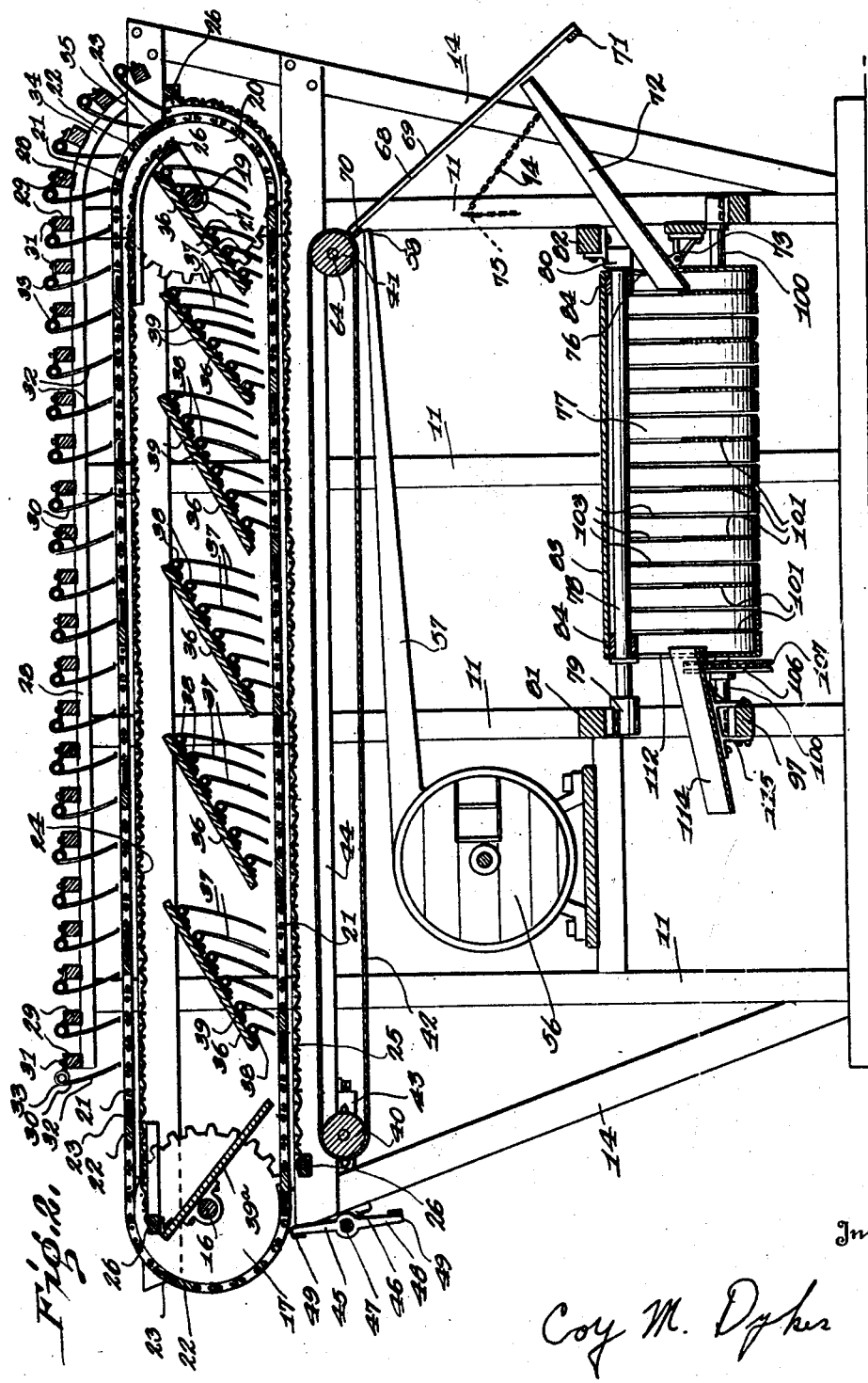
Inventor
Coy M. Dykes April 1, 1930. C. M. DYKES 1,752,375
PEANUT PICKING MACHINE
Filed May 10, 1928 3 Sheets-Sheet 3
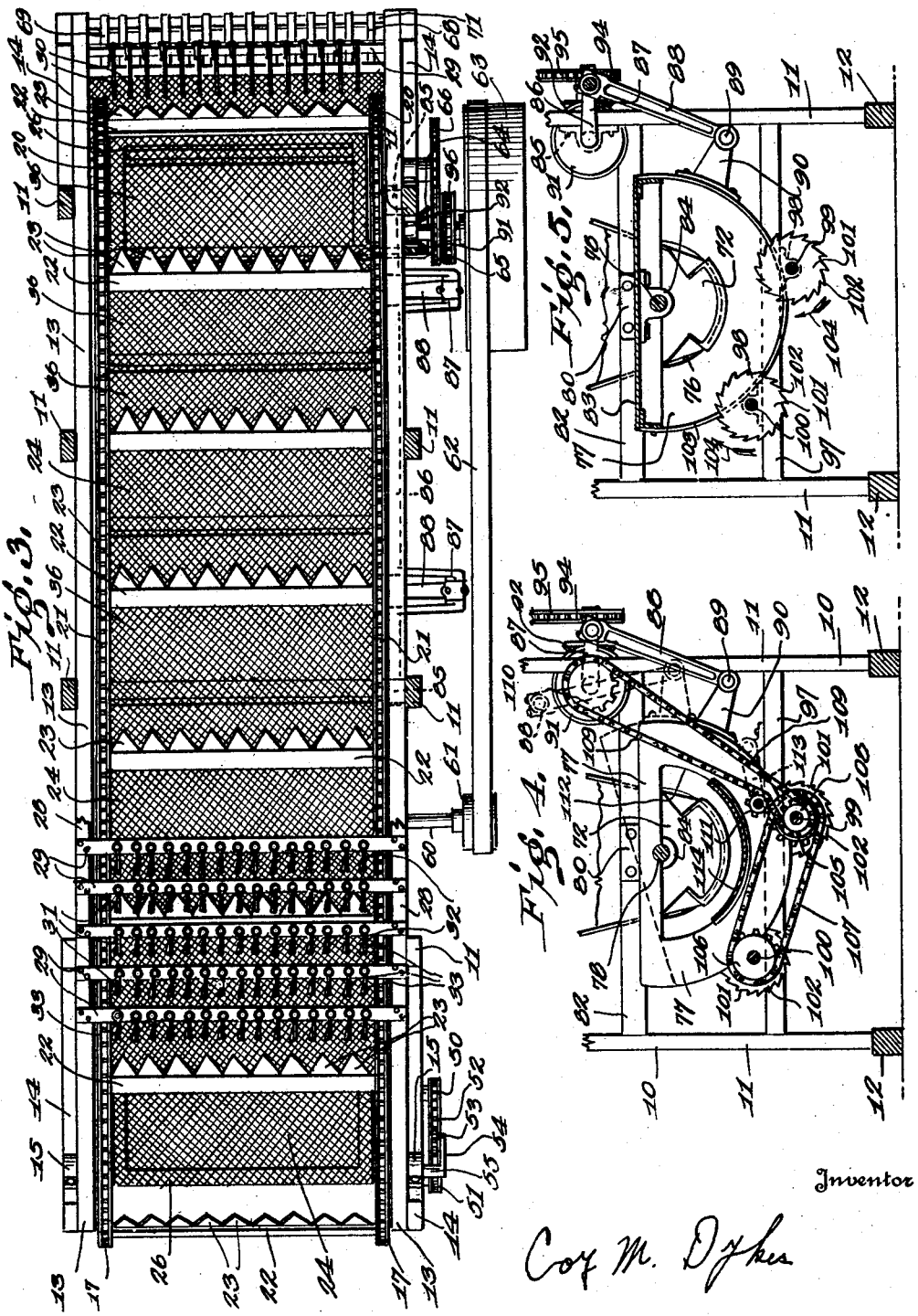
Inventor
Coy M. Dykes Patented Apr. 1, 1930

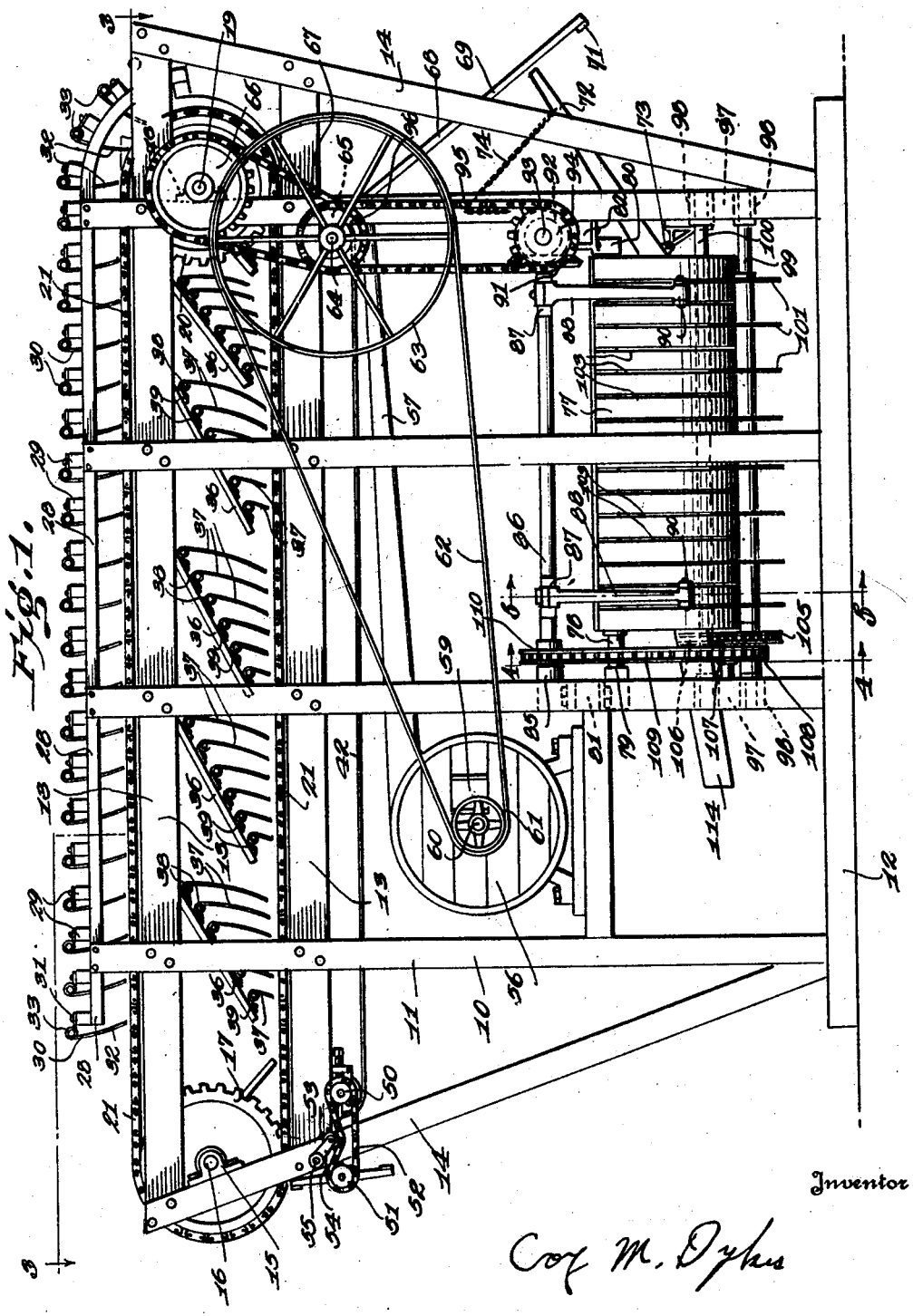

1,752,375

UNITED STATES PATENT OFFICE

COY M. DYKES, OF ARITON, ALABAMA

PEANUT-PICKING MACHINE

Application filed May 10, 1928. Serial No. 276,634.

The present invention relates to a peanut picking machine, and aims to provide a novel and improved machine of this character for conveniently and efficiently removing and separating pods from plants especially peanut bearing plants.

Another object of the invention is the provision of a pair of spaced screens over which the peanut plants are dragged, the mesh of said screens being of sufficient size to permit the pods to pass through the same and be removed from the plants as the latter are drawn over said screens by the feeding belt, the peanuts being forced down upon the screens by a plurality of spring fingers arranged above the screens for aiding in pushing the pods through the mesh of the screens.

A further object of the invention is to provide a pair of horizontally spaced separating screens over which travel bars of an endless feeding belt, said bars having teeth thereon for engaging the plants so as to drag the same over the uppermost of said screens and then over the lowermost screens between which are arranged a plurality of inclined chutes for directing pods dropping through the upper screen to certain points on the lower screen in order that said pods may readily pass through said lower screen.

A still further object of the invention is the provision of a power driven whirling paddle for engaging the plants after the pods have been removed therefrom for separating the plants from the cross bars of a conveyor which drags the pods over a separating screen.

The invention has for another object the provision of a pod conveyor arranged below a pod separating screen for receiving the pods and conveying the same to one end of the machine, said pods in passing from the conveyor being subjected to a blast of air for removing loose stems and other light foreign matter therefrom.

Still another object of the invention is to provide a drum mounted for rocking movement into which pods are placed, said drum being rocked from side to side as a plurality of rotary cutting elements extending into the interior of said drum engage and cut the remaining stems from the pods, said rotary cutting elements being mounted on stationary revolving axes, while the rocking of said drum throws the pods and stems remaining thereon into engagement therewith, said drum having the opposite ends thereof open so as to provide a feed end and a discharge end, said opening in said discharge end being on a lower plane than the opening in the feed end so that the pods gradually pass from the drum as all stems are removed therefrom.

It is also an object of the invention to provide a machine of the above indicated character, which may be manufactured at a reasonable cost, and one which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein:

Figure 1 is a side elevation of my improved peanut picking machine,

Figure 2 is a longitudinal vertical section through the same,

Figure 3 is a horizontal section taken on line 3—3 of Figure 1,

Figure 4 is a fragmentary vertical section taken on line 4—4 of Figure 1, and

Figure 5 is a similar section taken on line 5—5 of Figure 1.

In carrying out the invention, the frame 10 of the machine consists of a plurality of vertical uprights 11 which have their lower ends attached to a pair of spaced horizontal sills 12, while the upper end of the uprights 11 on each side of the machine have attached thereto on the inner faces thereof a pair of horizontal planks 13. The ends of the planks 13 extend beyond the outermost uprights 11 and are attached to outwardly inclined uprights 14, secured to the sills 12 at the lower ends of the outermost uprights 11, while their upper ends are spaced from the upper ends of the outermost uprights 11. The cross members for holding the opposite sides of the frame 10 together will be set forth as the description proceeds.

Attached to the upper ends of the inclined uprights 14 at one end of the frame are bearings 15 supporting a shaft 16, having a pair of sprocket gears 17 mounted thereon, at the inner sides of the planks 13, and at the opposite end of the frame on the outermost uprights 11 are attached a pair of bearings 18 for a transverse shaft 19 having mounted thereon a pair of sprocket gears 20 at opposite sides of the frame and at the inner sides of the planks 13. Trained about the sprocket gears 17 and 20 at each side of the frame is a pair of sprocket chains 21, between which extend at spaced intervals and having on the forward edges thereof a plurality of triangular plant engaging teeth 23, the upper stretch of the endless feeding belt so formed being on a plane above the upper edges of the planks 13. As clearly shown in Figure 3 of the drawings, it can be seen that the transverse bars carry a plurality of teeth 23 and that said teeth protrude forwardly of the bars 22 or in the direction of travel of the feeding belt.

Attached to the inner faces of the oppositely arranged planks 13 adjacent the upper edges thereof is a pair of upper and lower horizontal screens 24 and 25, respectively, said screens being constructed of wire mesh material having openings therein of sufficient size for permitting the pods of the peanut plants to drop therethrough. By referring to Figure 3 of the drawings, it can be seen that the strands of wire forming the mesh of the screen extend at angles with respect to the frame to provide openings which taper longitudinally of the machine so as to cause the pulling of the pods from the plants as they are brushed forwardly over the screen. By referring to Figure 2 of the drawings, it can be seen that the transverse bars 22 of the feeding belt are slightly above the screens 24 and 25 at the upper and lower runs of said feeding belt. The screens are supported at their opposite ends by bars 26 adjacent the sprocket gears 17 and 20, the cross bars 26 adjacent the sprocket gear 17 being attached at their ends to the longitudinal planks 13 at opposite sides of the frame of the machine. At the opposite end of the machine the upper screen 24 is gradually curved downwardly to a point adjacent the shaft 19 upon which the sprocket gears 20 are mounted and the bar 26 at this point is loosely attached to the shaft 19 by means of brackets 27, or the like, while the lower screen 25 at this end of the machine has its end curved upwardly to a point spaced outwardly of the end of the screen 24 and the bar 26 supporting the same is attached to the planks 13. Thus it can be seen that peanut plants dragged over the upper screen by the transverse bars 22 of the endless feeding belt will be carried onto the lower screen 25 to be further dragged thereover.

The extended upper ends of the uprights 11 have attached to the inner sides thereof a pair of longitudinally extending strips 28 between which a plurality of transversely extending supporting members 29 are attached and arranged in spaced parallel relation. Secured to each of the supporting members 29 at 31 is a plurality of spring fingers 30, extending downwardly and slightly rearwardly, as at 32, and terminating slightly above the transverse bars 22 of the feeding belt. The spring fingers 30 are coiled, as at 33, so as to increase the resiliency thereof. The ends of the longitudinal strips 28 above the rear end of the feeding belt are curved downwardly so as to conform substantially to the curvature of said belt as it passes over the sprocket wheels 20, and said ends of the strips 28 are attached on the upper edges of the uppermost planks 13, as at 35. The spaced supporting members 29 are continued throughout the entire length of the strips 28 so that the spring fingers 30 supported thereby will force the plants upon the lower screen 25. It can be seen that the triangular teeth on the transverse bars 22 of the feeding belt drag the plants over the screen 24, and that the spring fingers 30 above said belt and screen assist in removing the pods by forcing the plants down upon said screen as they are dragged thereover by the feeding belt.

Arranged between the upper screen 24 and the lower screen 25 and attached to the opposite sides of the frame 10 is a series of inclined boards 36 in parallel spaced relation to each other to form chutes for directing the pods removed from the screen 24 to certain points on the screen 25 and support a plurality of depending spring fingers 37 which extend downwardly into close proximity to the screen 25. Each of the inclined boards 36 has a plurality of the fingers 37 depending therefrom, and due to the fact that the boards are inclined it can be seen that the fingers are of increasing length from the lower to the upper end of each board, so that the resiliency of the longer fingers is greater than that of the shorter, and that due to the fact that the pods dropped upon the inclined boards 36 will be deposited onto the screen 25 at points in rear of the shortermost of said spring fingers, their movement will be retarded for removing stems as the pods pass through the lower screen 25. The spring fingers 37 are of a similar construction to the spring fingers 30 being provided with coiled portions 38 intermediate their ends and attached at one end to the board 36, as at 39. These spring fingers perform the same function with respect to the lower screen 25 as the fingers 30 do in connection with the screen 24, namely to force the plants containing the pods downwardly upon the screen so that the pods will pass through the screen and be pulled from the plants as the same are dragged over the screen. Between the forward ends of the screens 24 and 25, is an inclined chute 39ª carried by the shaft 16 and the bar 26 for directing peanuts sifted through the forward end of screen 24 to a point on the forward end of the screen 25 through which they will drop on to a conveyor 42.

Mounted beneath the screen 25 adjacent each end of the frame 10 is a pair of rollers 40 and 41 over which is trained a conveyor belt 42 adapted to receive the peanuts dropped through the lower screen 25 and convey the same to one end of the machine. The roller 41 is mounted in stationary bearings attached to the frame, while the roller 40 at the forward end of the machine is mounted in a slidable bearing 43 for permitting adjustment of the roller in order to obtain the proper tension of the conveyor belt 42. While I have shown an adjustable bearing 43 for the roller 40, it is to be understood that any approved type of adjustable bearing may be used. The belt conveyor 42 is adapted to turn in a direction so that the upper run thereof moves in the direction of the arrow 44, in the opposite direction of movement of the lower run of the feeding belt which carries the transverse bars 22 that move the plants over the screen 25. Thus it can be seen that as the pods drop from the lower screen 25 onto the conveyor belt 42 they are carried to the opposite end of the machine from that from which the plants are discharged. At the end of the machine where the plants, after having the pods separated therefrom, are discharged, a whirling paddle 45 is rotatably mounted on a shaft 47 journalled in bearings 46 and consisting of cross-heads 48 having transversely extending blades 49 attached to the ends thereof. The direction of movement of the whirling paddle 45 is such that the blades 49 will engage the plants as the same are moved off of the screen 25 and throw the same outwardly from engagement with the teeth 23 of the feeding belt so as to remove all plants from the bars and teeth prior to their return to the upper run of said feeding belt. As shown in Figure 1 of the drawings, a sprocket wheel 50 is mounted upon the shaft carrying the roller 40, and a sprocket wheel 51 mounted upon the shaft 47 of the whirling paddle 45, with a sprocket chain 52 trained over said sprocket wheels so that the driving connection to the whirling paddle is from the belt conveyor 42. Due to the fact that the roller 40 is adjustably mounted and the position thereof is changed with respect to the whirling paddle 45, I have provided an idler 53 which engages the upper run of the sprocket chain 42 in order to take up all slack in said sprocket chain. The idler 53 is carried by a weighted arm 54 pivotally mounted to the frame of the machine, as at 55.

Mounted beneath the conveyor belt 42 on the frame 10 by suitable cross members is a fan 56 provided with a long air outlet spout 57 terminating at a point beneath the discharge end of the conveyor belt 42, as at 58, to supply a blast of air at this point so that when the pods pass from the belt all twigs and foreign substances of light weight will be blown from the pods. The fan 56 has an adjustable inlet opening 59 in one side thereof for regulating the amount of air introduced into the fan and the velocity of the blast of air on the pods during the discharge of the same from the conveyor belt. The fan is driven by rotor shaft 60 which has mounted thereon a belt pulley 61 over which a driving belt 62 is trained from the main power supplying belt pulley 63, the latter being of greater circumference than the belt pulley 61 in order to cause the rotating of the fan at a relatively high rate of speed. The main drive pulley 63 is mounted upon the shaft 64 on which the roller 41 is mounted and forms the driving connection to the conveyor belt 42. In order to drive the feeding belt a sprocket wheel 65 is also mounted on the shaft 64, while a sprocket wheel 66 is mounted upon the shaft 19 carrying the sprocket wheels 20, and a sprocket chain 67 is trained about the sprocket wheels 65 and 66 which forms the driving connection above referred to.

At the points where the pods are discharged from the conveyor belt 42, the upper end of an inclined chute 68 is arranged consisting of a plurality of parallel bars 69, spaced a sufficient distance apart for permitting pods to pass between the same yet directing objects of greater size or length downwardly thereover. The ends of the bars 69 are attached together by transverse bars 70 and 71 at opposite ends of the chute 68. As the pods drop through the chute 68 they fall upon an oppositely inclined chute 72, adjustably secured to the frame so that the position thereof may be adjusted with respect to the chute 68 for varying the amount of pods and any remaining foreign substances to be caught by the chute 72. For adjustment the chute 72 is pivotally supported at its lower end by a bracket 73 mounted upon the frame of the machine while its upper end is connected to the frame by flexible elements, such as chains 74 engaged by hooks, or similar elements, 75. The pods caught in the chute 72 are directed downwardly through an open end 76 of a drum 77.

The drum 77 is of semi-cylindrical formation and is attached to a shaft 78 mounted in bearings 79 and 80, said bearings being carried by cross members 81 and 82 of the frame 10. The shaft 78 is at the axis of the semi-cylindrical drum, and the latter is provided with a top 83 for closing the same, and secured to said top 83 are brackets 84 for fixing the drum to the shaft 78. Mounted upon the uprights 11 at one side of the frame above and slightly to the side of the drum in suitable bearings 85 is a crankshaft 86, having a pair of offset crank portions 87 to which connecting rods 88 are rotatably connected at one end, the other end of said connecting rods 88 being pivotally connected, as at 89, to brackets 90 secured to one side of the semi-cylindrical drum 77. The arrangement of the crank shaft with respect to the drum is such that as the crankshaft is rotated, the connecting rods and brackets will cause a rocking movement of the semi-cylindrical drum.

On one end of the crankshaft 86 is attached a bevel gear 91 which meshes with another bevel gear 92 carried by and fixed to a stub shaft 93 rotatably supported in bearings on an upright 11 of the frame. Also carried and fixed to the stub shaft 93 is a sprocket wheel 94 over which a sprocket chain 95 is trained from another sprocket wheel 96 fixed to the shaft 64 having the main belt driving pulley 63 thereon. Thus it can be seen that the driving connection for the crank shaft 86 will be from the main belt drive pulley 63 through the sprocket wheel 96, chain 95, sprocket wheel 94, stub shaft 93, bevel gear 92, and bevel gear 91.

Attached to opposite uprights 11 of the frame 10 are transverse supporting members 97 to which are secured bearings 98 in which are journalled a pair of shafts 99 and 100, extending from one transverse supporting member 97 to the other and being mounted in the bearings carried by said supporting members. Each of the shafts 99 and 100 carry a plurality of spaced disks or blades 101 provided at their peripheries with oppositely beveled teeth 102 for removing stems and other extraneous substance from the pods. The semi-cylindrical drum 77 is constructed of a plurality of slats slightly spaced from each other so as to provide slots 103 through certain of which the toothed disks extend. It is to be noted that the disks do not pass through all the slots 103 and that by having certain of the slots without toothed disks, stems, sand and other small foreign matter may sift through them so as not to interfere with the action of the teeth on the cutting blades. The spaces between the slats extend around practically the entire semi-cylindrical drum so as to permit rocking of the drum without interfering with the operation of the cutting blades. While I have shown the semi-cylindrical drum constructed of a plurality of slightly spaced slats to provide the slots 103, it is to be understood that the same may be constructed of one piece and then slotted in order to receive the toothed cutting or scraping disks. By referring to Figure 5 of the drawings, it can be seen that the shaft 99 is slightly to one side of the vertical plane through the axis of the drum 77, while the shaft 100 is at a greater distance beyond the other side of said vertical plane, the purpose of this arrangement being to permit an even cutting or scraping within the drum due to the fact that both sets of blades rotate in the same direction, indicated by the arrows 104.

Carried upon one end of the shafts 99 and 100 are sprocket wheels 105 and 106 respectively, around which is trained a sprocket chain 107 which causes the rotating of the disk shaped cutting blades on both shafts 99 and 100 in the same direction. Also mounted upon the shaft 99 is another sprocket wheel 108 from which a sprocket chain 109 extends to a sprocket wheel 110 mounted upon and attached to the crank shaft 86. An idler 111 engages one run of the chain 109 in order to hold the same to one side of the opening 112 in the discharge end of the drum 77, said idler being carried by a weighted arm 113 pivoted on a transverse supporting member 97. Extending into the opening 112 is an inclined chute 114 through which the peanuts pass when discharged from the drum 77. The chute 114 is supported in proper position by means of a bracket 115 secured to one of the transverse supporting members 97. It is to be noted that the feed opening 76 at one end of the drum and the discharge opening 112 at the opposite end thereof are provided with lower curved surfaces having the same points of center as that of the semi-cylindrical curved surface of the drum, so that as the drum is rocked from side to side the chutes 72 and 114 will be in close position to the lower curved edges of said opening. It also is to be noted that the opening 112 is slightly lower than the opening 76, which will cause the peanuts to be gradually discharged through the opening 112 when the level of the peanuts in the drum is in alinement with the lower edge of said opening.

In operation, a driving belt on the main drive pulley 63 is connected with any suitable power supplying plant which will cause the operation of the various elements of the machine. The plants containing the pods are placed upon the end of the upper screen 24 where the sprocket gears 17 are arranged and due to the fact that the upper run of the sprocket chains 21 carrying the cross bars 22 is in a direction towards the opposite end of the machine, the plants will be dragged over the upper screen 24 and held in contact with said screen by the spring fingers 30 arranged thereabove. The teeth 23 on the cross bars 22 will engage the plants so as to move the same over the screen. Due to the fact that the mesh which forms the screen 24 is arranged with the strands of wire at angles with respect to the line of travel of the plants the pods entering the openings in the screen will be pulled from the plants at the latter are moved over the screen. When the plants are moved to the opposite end of the screen 24, they will be carried onto one end of the lower screen 25, due to the construction of the ends of the screen and the manner in which the transverse bars move with relation to the screen. As the sprocket chains 21 are continuous, the lower run of the same will cause the dragging of the plants over the lower screen. The spring fingers 37 are arranged above the lower screen to act in a similar manner to the spring fingers 30 so as to hold the plants down in engagement with the screen 25. As the plants are moved over the lower screen 25, the remaining pods entering the openings therethrough will be pulled from the plants as explained with reference to the other screen. When the plants reach the opposite end of the screen 25, they are engaged by the whirling paddle 45 so as to throw the plants away from the transverse bars 22 and teeth 23 in order to eliminate the danger of plants being carried around the sprocket gears 17 and not over the upper screen 24. As the whirling paddle revolves at a higher rate of speed than the travel of the transverse bars 22, it can be seen that the paddle will act in an efficient manner in order to relieve the bars of all plants after the same have been dragged completely over both the upper and lower screens.

The pods dropping through the upper screen fall upon the inclined boards 36 and are directed to certain points on the lower screen 25. Such points are between the series of teeth carried by the different boards 36 so that the plants being relieved from a packed condition at these points the pods may easily drop through the plants onto and through the lower screen 25. The pods dropping from both the upper and lower screens 24 and 25 fall upon the belt type conveyor 42 which moves in the direction indicated by the arrow 44, being opposite to that of the lower run of the chains 21. The pods will be moved to the end of the machine where the inclined chute 68 is arranged. As the chute 68 is of a construction for permitting the pods to drop therethrough and prevent the passage of larger objects a separating action is had at such point. Also for aiding in separating twigs, foliage, stems, and other light foreign matter from the pods a blast of air is supplied at the point where the pods pass from the conveyor 42 for blowing the same beyond the inclined chute 72.

The peanuts dropping through the flat constructed chute 68 fall into the inclined chute 72 and are directed into the feed end of the drum 77. As the drum 77 is rocked from side to side by means of the crankshaft and connecting rod construction, the pods therein will be thrown from one side to the other, and due to the fact that the disk shaped cutting blades 101 carried by the shafts 99 and 100 extend into the drum, the teeth 102 on said disks will serve to cut away the stems that may still remain on the pods. As will be noted the disk shaped cutting blades are spaced a distance apart for operating on all objects of a length slightly greater than pods so as to remove all clinging stems from the pods. As the pods accumulate in the drum 77, they remain in the drum until the level thereof is on a horizontal plane with the inner end of the chute 114, at which time all pods above such plane will pass out of the chute and into hoppers or the like.

As the rotary cutting blades 101 having the teeth 102 are carried by shafts mounted in stationary bearings, it can be seen that the position of the shafts and blades remain the same during rotary movement and that as said blades work through slits in the drum rocking movement of the latter is permitted to throw the pods and stems attached thereto into and out of engagement with the teeth of the cutting blades so as to completely remove all stems from the pods before the same pass from the discharge end of the drum. Due to the fact that both sets of rotary cutting blades rotate in the same direction, indicated by the arrows 104 in Figure 5 of the drawings, I have arranged one set of rotary cutting disks slightly to one side of a vertical plane beneath the center of the drum and the other set of rotary cutting blades spaced considerably from said plane, whereby one set of cutting blades will do the same amount of work as the other.

Having thus described my invention, what I claim as new is:

1. A peanut picking machine comprising a pair of spaced apart horizontal screens, an endless conveyor passing over rollers at the end of the upper screen and having the opposite runs thereof travelling above the upper and lower screens, respectively, for moving the leguminous plants over said screens so that the pods may drop through the screens successively.

2. A peanut picking machine comprising a pair of spaced apart horizontal screens, an endless conveyor having the opposite runs thereof travelling above the screens respectively for moving the leguminous plants over said screens so that the pods may pass through the screens successively and be picked as the plants are moved over said screens, spring fingers above the uppermost screen for forcing the plants in engagement therewith, a plurality of inclined plates between the screens, and spring fingers on the upper side of said plates for forcing the plants in engagement with the lowermost screen.

3. A peanut picking machine comprising a pair of spaced apart horizontal screens, an endless conveyor having the opposite runs thereof travelling above the screens respectively for moving leguminous plants over said screens successively so that the pods on said plants may pass through the screens and be picked as the plants are moved over said screens, spring fingers arranged above the uppermost screen for forcing the plants in engagement therewith, a plurality of inclined plates arranged between said screens, and spring fingers on the upper side of said plates for forcing the plants in engagement with the lowermost screen, the spring fingers carried by each plate being spaced slightly from the spring fingers carried by the plate adjacent thereto.

4. A peanut picking machine comprising a pair of spaced apart horizontal screens, an endless conveyor having the opposite runs thereof travelling above the screens respectively for moving leguminous plants over said screens so that the pods may pass through the screens and be picked as the plants are moved over said screens, spring fingers above the uppermost screen for forcing the plants in engagement with the upper screen, a plurality of inclined plates between said screens, and spring fingers carried on the upper side of said plates for forcing the plants in engagement with the lowermost screen, said spring fingers being of various lengths and all terminating slightly above the lower screen for forming a greater pressure on the plants at the declined edges of the plates.

5. A peanut picking machine comprising a screen, a conveyor, transverse bars carried by the conveyor and disposed slightly above the screen for dragging leguminous plants over the screen, spring fingers above said transverse bars for forcing the plants in engagement with the screen, and triangularly shaped teeth on the forward edges of said transverse bars providing tapered recesses for engaging the plants to drag them over the screen.

6. A peanut picking machine comprising a pair of spaced apart horizontal screens, an endless conveyor for dragging the leguminous plants over said screens, said conveyor having its upper run above the upper screen and the lower run above the lower screen, the screens being constructed so that plants moved from the upper screen will be moved onto the lower screen for passage over said lower screen.

7. A peanut picking machine comprising a screen, an endless conveyor having a run thereof above said screen, and a whirling paddle at the end of the screen for engaging the leguminous plants after they are dragged over said screen by said conveyor and for throwing the same from the conveyor.

8. A peanut picking machine comprising a supporting frame, an endless conveyor or feeding-belt mounted therein, a screen supported below the upper run of the belt, and a screen supported below the lower run of said belt and having the end thereof cooperating with the discharge end of the upper screen curved upwardly beyond the conveyor, the feeding-belt serving to drag the plants over the screens successively.

9. A peanut picking machine comprising a supporting frame, an endless conveyor or feeding-belt mounted therein, a screen supported below the upper run of the belt and having its discharge end curved downwardly at a slight distance from the feeding-belt, and a screen supported below the lower run of the feeding-belt and having the end thereof cooperating with the discharge end of the upper screen curved upwardly beyond said belt, the feeding-belt serving to drag the plants over the screens successively.

10. A peanut picking machine comprising a supporting frame, an endless conveyor or feeding-belt mounted therein, a screen supported below the upper run of the belt and having its discharge end curved downwardly at a slight distance from the feeding-belt, and a screen supported below the lower run of the feeding-belt and having the end thereof cooperating with the discharge end of the upper screen curved upwardly beyond said belt, the feeding-belt serving to drag the plants over the screens successively; together with a carrier-belt for the pods mounted below the lower screen, and a blower directing a blast of air at the end of said carrier-belt.

11. A peanut picking machine comprising a supporting frame, an endless conveyor or feeding-belt mounted therein, a screen supported below the upper run of the belt, and a screen supported below the lower run of said belt and curved upwardly beyond the same at the discharge end of the upper screen; together with spring fingers above the upper and lower runs of the feeding-belt for pressing the plants through said belt and against the screens.

12. A peanut picking machine comprising a supporting frame, an endless conveyor or feeding-belt mounted therein, a screen supported below the upper run of the belt and having its discharge end curved downwardly a slight distance from said belt, a screen supported below the lower run of the belt and curved upwardly beyond the same at the discharge end of the upper screen, and spring fingers above the upper and lower runs of the feeding-belt for pressing the plants through said belt and against the screen; together with a carrier-belt for the pods mounted below the lower screen, and a blower directing a blast of air at the end of said carrier-belt.

COY M. DYKES.